United States Patent
Juliusson

(10) Patent No.: US 12,551,961 B2
(45) Date of Patent: Feb. 17, 2026

(54) WELD CIRCUIT INDUCTANCE TRACKING

(71) Applicant: ESAB AB, Gothenburg (SE)

(72) Inventor: David Juliusson, Gothenburg (SE)

(73) Assignee: ESAB AB, Gothenburg (SE)

( * ) Notice: Subject to any disclaimer, the term of this patent is extended or adjusted under 35 U.S.C. 154(b) by 1025 days.

(21) Appl. No.: 17/588,869

(22) Filed: Jan. 31, 2022

(65) Prior Publication Data

US 2023/0241702 A1    Aug. 3, 2023

(51) Int. Cl.
    *B23K 9/095*     (2006.01)
    *B23K 9/09*      (2006.01)
    *B23K 9/10*      (2006.01)

(52) U.S. Cl.
    CPC .............. *B23K 9/0953* (2013.01); *B23K 9/09* (2013.01); *B23K 9/1062* (2013.01)

(58) Field of Classification Search
    CPC ........ B23K 9/095; B23K 9/09; B23K 9/0953; B23K 9/1062; B23K 10/006
    See application file for complete search history.

(56) References Cited

U.S. PATENT DOCUMENTS

| | | | | |
|---|---|---|---|---|
| 6,002,104 | A * | 12/1999 | Hsu | B23K 9/0953 219/137 PS |
| 6,248,976 | B1 * | 6/2001 | Blankenship | B23K 9/0953 219/130.21 |
| 6,359,258 | B1 | 3/2002 | Blankenship et al. | |
| 8,344,287 | B2 | 1/2013 | Schmitt et al. | |
| 8,440,936 | B2 | 5/2013 | Åberg et al. | |
| 8,455,794 | B2 | 6/2013 | Vogel | |
| 8,546,726 | B2 | 10/2013 | Vogel | |
| 8,653,413 | B2 | 2/2014 | Vogel | |
| 8,884,188 | B2 | 11/2014 | Vogel | |
| 9,095,921 | B2 | 8/2015 | Peters et al. | |
| 9,132,503 | B2 | 9/2015 | Schmitt et al. | |
| 9,144,856 | B2 | 9/2015 | Vogel | |
| 9,387,550 | B2 * | 7/2016 | Davidson | B23K 9/0956 |
| 9,506,958 | B2 | 11/2016 | Davidson et al. | |
| 10,118,243 | B2 | 11/2018 | Peters et al. | |

(Continued)

OTHER PUBLICATIONS

Notification of Transmittal of International Search Report and Written Opinion for International Application No. PCT/IB2023/050591 mailed May 23, 2023, 14 pages.

*Primary Examiner* — Brian W Jennison
(74) *Attorney, Agent, or Firm* — Edell, Shapiro & Finnan, LLC

(57) ABSTRACT

A method is performed in a welding or cutting system, including a power supply to deliver a current through a weld circuit to a welding torch to create an arc. The method includes: measuring the current to produce a measured current; measuring a voltage on a sense point of the power supply or the weld circuit that is spaced from the welding torch, to produce a measured voltage that differs from the arc voltage by a voltage drop caused by the current and inductance of the weld circuit; compensating the measured voltage for the voltage drop using the measured current and an inductance value, to produce a compensated voltage; computing a derivative of the compensated voltage; computing a second derivative of the measured current; and upon determining the inductance value and the inductance differ based on the derivative and the second derivative, adjusting the inductance.

20 Claims, 11 Drawing Sheets

(56) References Cited

U.S. PATENT DOCUMENTS

| | | | |
|---|---|---|---|
| 10,189,106 B2* | 1/2019 | Mehn | B23K 9/1062 |
| 10,239,146 B2* | 3/2019 | Davidson | B23K 9/0953 |
| 10,464,155 B2 | 11/2019 | Davidson et al. | |
| 10,486,270 B2 | 11/2019 | Pfeifer et al. | |
| 11,623,292 B2* | 4/2023 | Fleming | B23K 9/02 |
| | | | 219/76.1 |
| 11,660,695 B2* | 5/2023 | Anders | B23K 9/235 |
| | | | 219/130.33 |
| 2010/0308026 A1* | 12/2010 | Vogel | B23K 9/1006 |
| | | | 219/130.21 |
| 2010/0308027 A1* | 12/2010 | Vogel | B23K 9/0953 |
| | | | 219/130.21 |
| 2012/0061362 A1* | 3/2012 | Davidson | B23K 9/0953 |
| | | | 219/130.31 |
| 2014/0076871 A1* | 3/2014 | Davidson | B23K 9/1043 |
| | | | 219/124.1 |
| 2014/0209587 A1* | 7/2014 | Davidson | B23K 9/0953 |
| | | | 219/130.01 |
| 2016/0167151 A1* | 6/2016 | Mehn | B23K 9/1062 |
| | | | 219/130.21 |
| 2017/0225254 A1* | 8/2017 | Ulrich | B23K 9/0953 |
| 2018/0257161 A1* | 9/2018 | Anders | B23K 9/1062 |
| 2019/0217412 A1 | 7/2019 | Davidson et al. | |
| 2020/0094356 A1 | 3/2020 | Pfeifer | |
| 2020/0122263 A1 | 4/2020 | Knoener | |
| 2020/0306859 A1* | 10/2020 | Fleming | B23K 9/02 |
| 2021/0129252 A1 | 5/2021 | Pfaller | |

\* cited by examiner

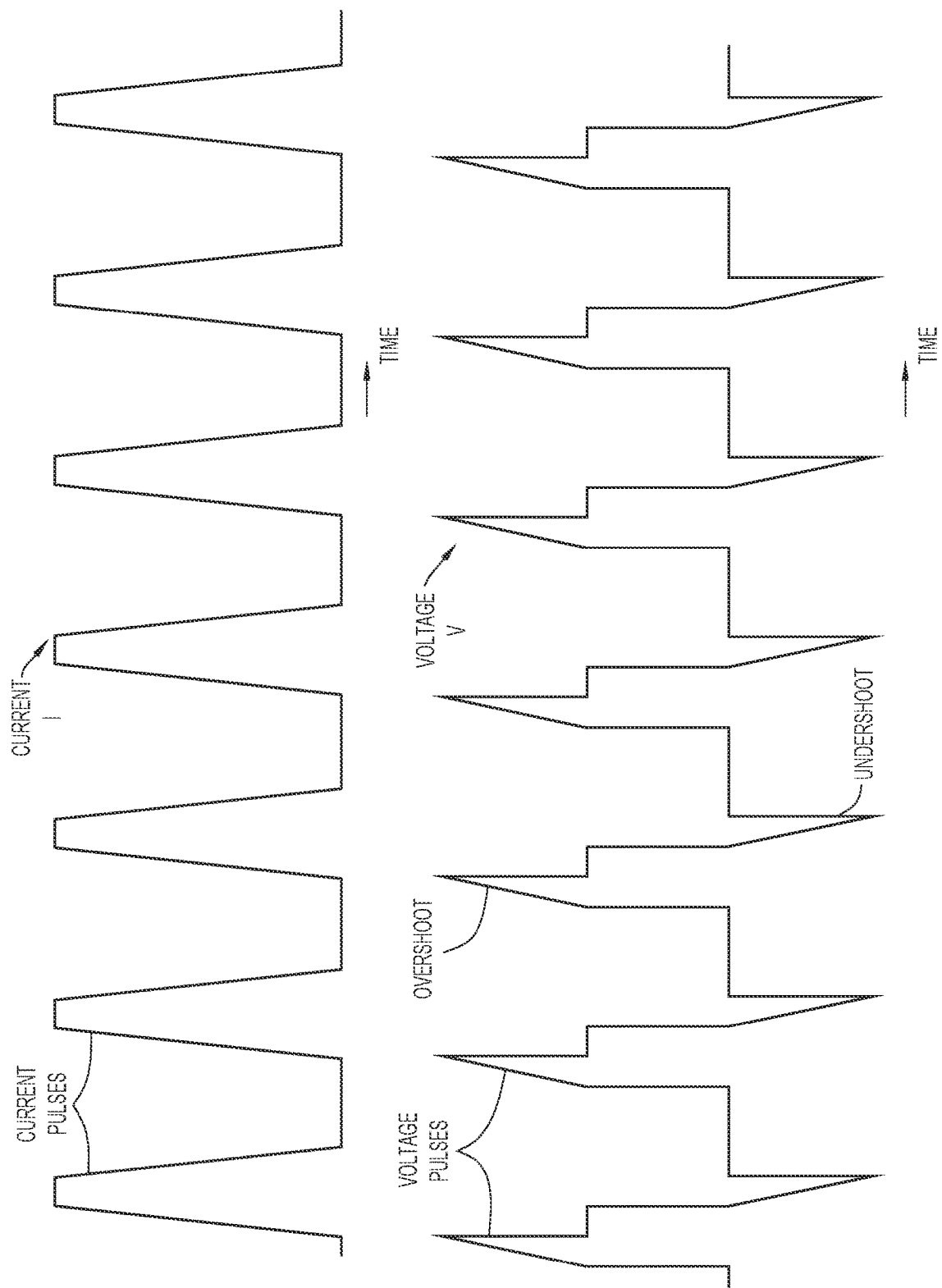

WELD CIRCUIT INDUCTANCE TRACKING

TECHNICAL FIELD

The present disclosure relates generally to an apparatus and methods related to welding and cutting.

BACKGROUND

In welding and plasma cutting systems, accurate measurement of the weld current and the voltage of the electric arc between the welding/cutting electrode and a workpiece enable more precise control of the welding/cutting process. While measuring weld current is generally straightforward, precisely determining the arc voltage is a significant challenge. Various attempts have been made to more accurately determine arc voltage by measuring voltage in close proximity to the arc, but this approach typically requires additional sensors and feedback signals that add cost and complexity to the system. Remotely measuring arc voltage at the welding/cutting power supply is more convenient but suffers from inaccuracies caused by resistance and inductance present in the system between the power supply and the welding/cutting arc. Voltage variations caused by inductance can be particularly troublesome, because they fluctuate with changes in current, which are particularly prevalent in pulsed waveforms, and inductive effects may also vary throughout a welding/cutting operation as the physical arrangements of the welding power cables and the welding wire change. For example, even with the same weld cable setup, moving or changing the geometry of the weld cables will change the inductance, and placing the weld cables over/around an iron-containing metal will change the inductance. While schemes have been proposed to estimate and compensate for these effects, there remains a need to more accurately determine arc voltage at a point in the system remote from the welding/cutting arc, such as at the power supply.

BRIEF DESCRIPTION OF THE DRAWINGS

FIG. 2B is an illustration of an example current waveform for a weld current in the welding system, and an example voltage waveform for a voltage associated with the weld current.

DESCRIPTION OF EXAMPLE EMBODIMENTS

Overview

The method includes: measuring the current to produce a measured current; measuring a voltage on a sense point of the power supply or the weld circuit that is spaced-apart from the welding torch, to produce a measured voltage that differs from the arc voltage by a voltage drop caused by the current and inductance of the weld circuit; compensating the measured voltage for the voltage drop using the measured current and at least an inductance value that represents the inductance, to produce a compensated voltage; computing a derivative of the compensated voltage; computing a second derivative of the measured current; and upon determining that the inductance value and the inductance differ based on the derivative and the second derivative, adjusting the inductance value toward the inductance and repeating the compensating with the inductance value as adjusted.

Example Embodiments

Figure 1:
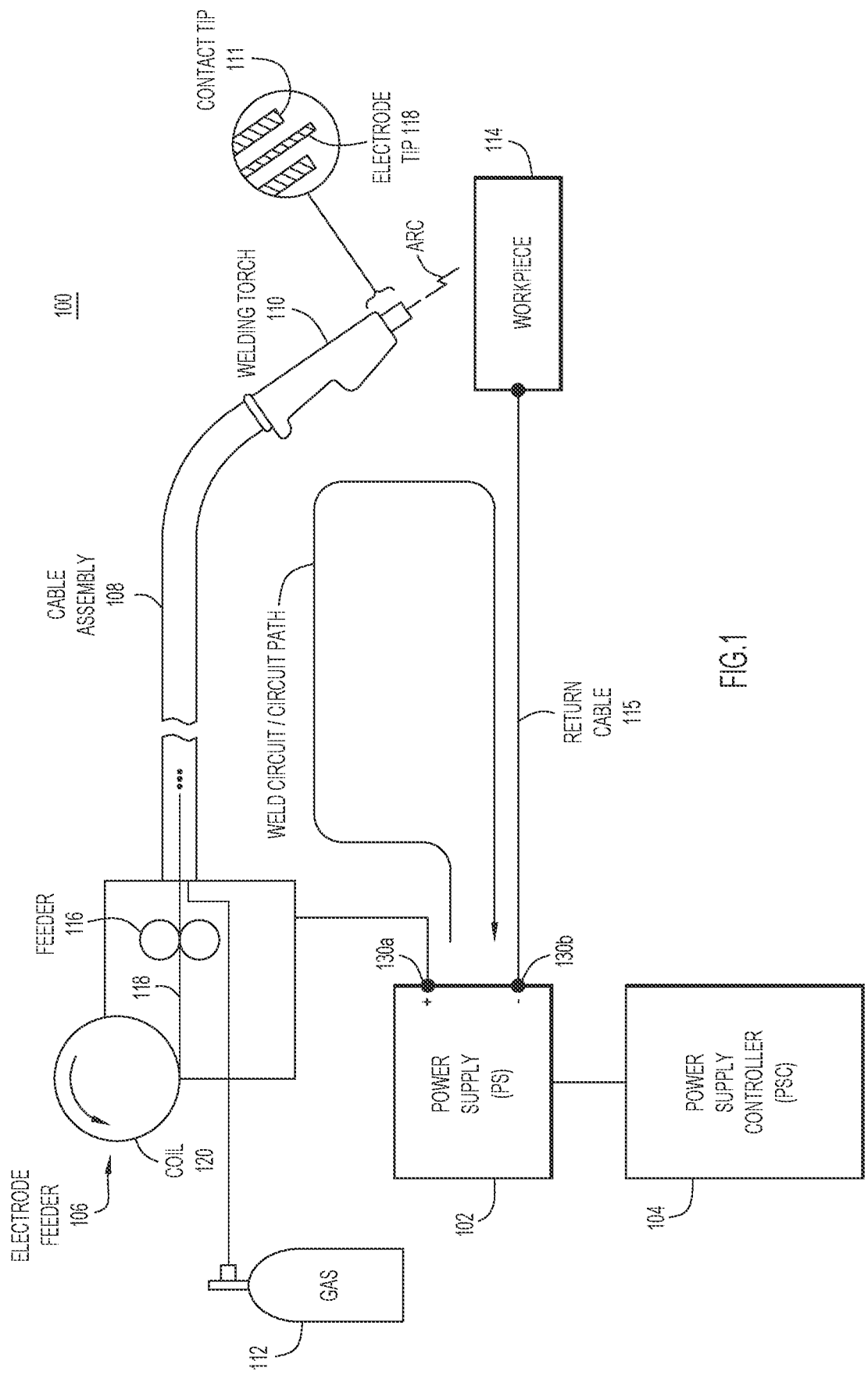
FIG. 1 is an illustration of an example welding or cutting system in which arc voltage compensation and inductance tracking for a weld circuit of the welding system may be performed.

With reference to FIG. 1, there is an illustration of an example metal inert gas (MIG)/metal active gas (MAG) welding system 100, in which embodiments directed to tracking inductance in the welding system may be implemented. The embodiments are presented in the context of MIG/MAG welding by way of example only. It is understood that the embodiments may be employed generally in any know or hereafter developed welding environments, such as, but not limited to, tungsten inert gas (TIG) welding, flux cored arc welding (FCAW), shielded metal arc welding (SMAW) or stick welding, submerged arc welding (SAW), and so on. Additionally, the embodiments may be employed equally in an arc cutting apparatus. Welding system 100 includes: a power supply 102, such as a switching power supply; a power supply controller (PSC) 104 coupled to and configured to control the power supply; an electrode feeder 106 coupled to the power supply; a cable assembly 108 coupled to the electrode feeder; a welding gun or torch 110 coupled to the cable assembly and having a sturdy metal contact tip 111 that extends from an end of the welding gun or torch; a gas container 112 coupled to the cable assembly; and a workpiece 114 coupled to the power supply through at least a return path/cable 115. In the ensuing description, the terms "weld" and "welding" are synonymous and interchangeable. Also, the terms "weld" and "welding" refer broadly to both welding and plasma cutting systems and operations.

Electrode feeder 106 includes a feeder 116 to feed an electrode 118 from a coiled electrode 120 through cable assembly 108 and through contact tip 111 of welding torch 110, which is in electrical contact with the electrode. Under control of PSC 104, power supply 102 generates weld current that drives the welding process/operation. In an example, power supply 102 is a switching power supply that includes a power inverter having switching devices switched on and off with a duty cycle and at switching frequency controlled by PSC 104, to convert direct current (DC) power to high-frequency alternating current (AC) power, which is subsequently transformed and rectified to produce weld current. In welding operations that involve a pulsed or periodic waveform, the weld current typically includes a series of weld current pulses. Power supply 102 provides the weld current from an output terminal 130a of the power supply to electrode 118, through electrode feeder 116, cable assembly 108, and welding torch 110, while the cable assembly also delivers a shielding gas from gas container 112 to the welding torch.

The weld current creates an arc between workpiece 114 and a tip of electrode 118 (referred to as an "electrode tip" or an "electrode stick") extending through contact tip 111 of welding torch 110. To control the weld process, PSC 104 controls the weld current based in part on a voltage of the arc (i.e., an arc voltage). Thus, it is important for PSC 104 to acquire an accurate measurement of the arc voltage throughout the weld process. Because it may be impractical or inconvenient to sense the arc voltage directly at the arc itself, an arc voltage measurement may be made remotely from welding torch 110, without sensing voltage equipment near the arc. For example, the arc voltage measurement may be made at a voltage sense point spaced-apart from the arc by a substantial distance along a circuit path of welding system 100 through which the weld current flows when the arc is present. The aforementioned circuit path is referred to as a "weld circuit," and may include, for example, a circuit path from output terminal 130a of power supply 102 to an output terminal 130b of the power supply, through electrode feeder 106, cable assembly 108, welding torch 110, workpiece 114, and return path 115 from workpiece 114 to output terminal 130b of the power supply.

The arc voltage measurement made at the voltage sense point differs from the arc voltage due to one or more voltage drops that are a function of the weld current, which changes dynamically, and one or more electrical circuit parameters or characteristics of the weld circuit through which the weld current flows. For example, the arc voltage may differ from the arc voltage measurement due to resistive and inductive voltage drops arising from a resistance and an inductance of the weld circuit, respectively. The inductance may change over time for a variety of reasons. Accordingly, embodiments presented herein track the inductance of the weld circuit so that arc voltage measurement compensation based on the inductive voltage drop can produce an accurate estimate of the arc voltage.

Figure 2A:
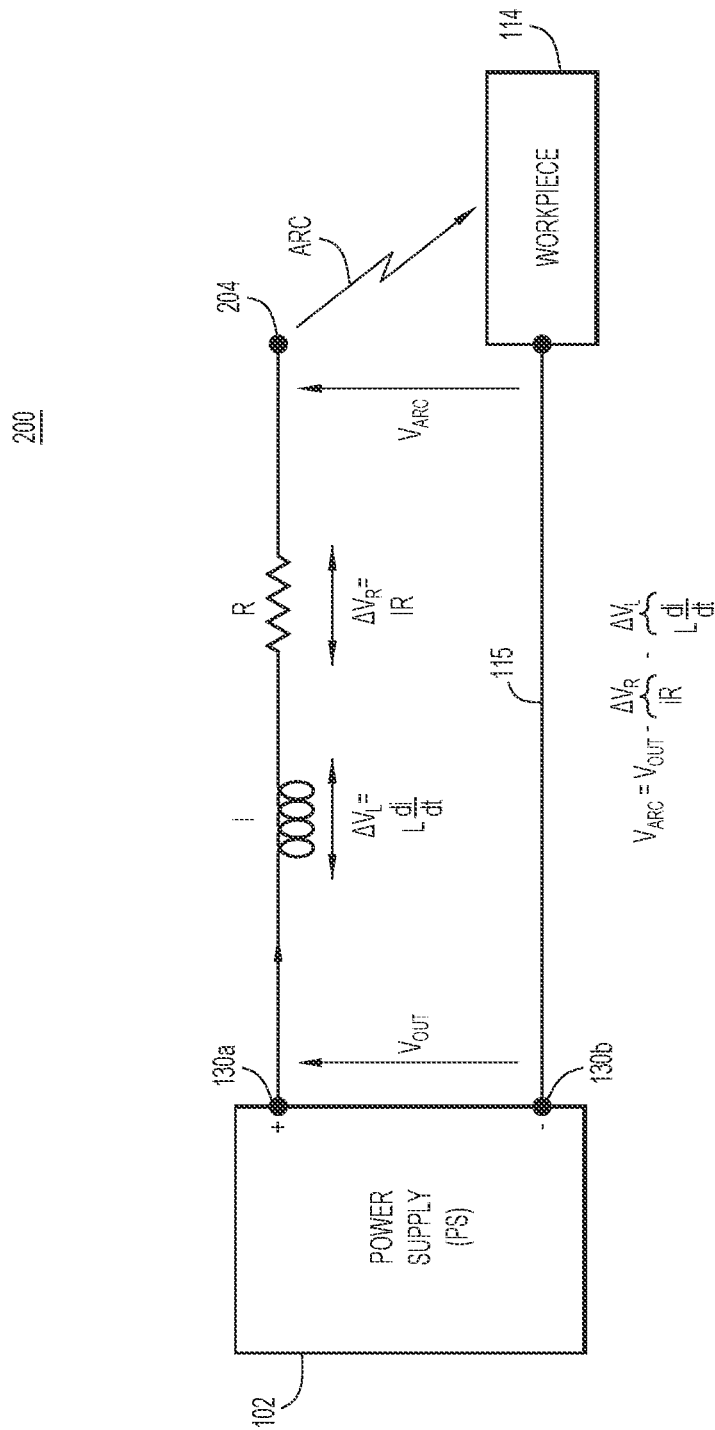
FIG. 2A is an illustration of an example equivalent circuit for the weld circuit.

With reference to FIG. 2A, there is an illustration of an example equivalent circuit 200 for the above-mentioned weld circuit. Equivalent circuit 200 includes a resistance R and an inductance L of the weld circuit connected in series between output terminals 130a and 130b of power supply 102 and a terminal 204 that represents contact tip 111/the electrode tip at welding torch 110. Power supply 102 supplies weld current I to welding torch 110 through resistance and inductance R, L, which result in respective voltage drops $\Delta V_R = IR$, $\Delta V_L = L \cdot dI/dt$, where $dI/dt$ is a rate of change of current I, or current slope. Assuming a voltage V at output terminals 130a and 130b, an arc voltage $V_{ARC}$ at terminal 204 is given by the following equation:

$$V_{ARC} = V - IR - L \cdot dI/dt.$$

Armed with values for resistance R, inductance L, a measurement of voltage V, and a measurement of current I, arc voltage $V_{ARC}$ may be computed based on the equation above. Embodiments presented herein compensate the measurement of V for resistive and inductive voltage drops $\Delta V_R$ and $\Delta V_L$ based on resistance and inductance R, L, to produce an accurate estimate of arc voltage $V_{ARC}$. The embodiments also dynamically track changes in inductance L that can occur in the weld circuit.

With reference to FIG. 2B, there is an illustration of a current waveform for weld current I, and a voltage waveform for voltage V associated with the weld current. Weld current I includes a series of weld current pulses, and voltage V includes a series of voltage pulses corresponding to the current pulses. Voltage V is offset from arc voltage $V_{ARC}$ due in part to the resistive voltage drop, and also because each voltage pulse includes a leading spike or overshoot voltage and a trailing spike or undershoot voltage that results from the inductive voltage drop ($L \cdot dI/dt$).

Figure 3:
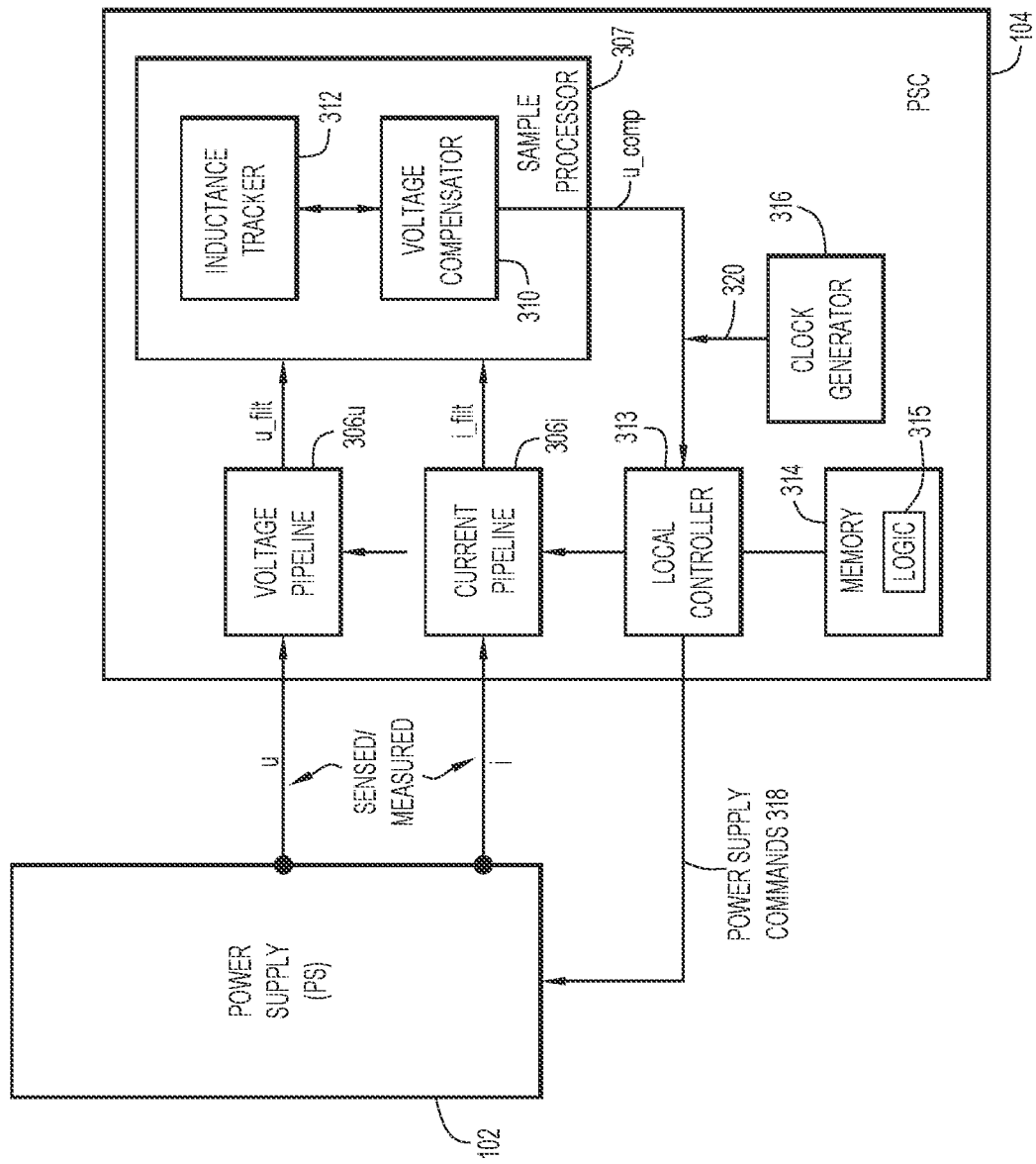
FIG. 3 is a block diagram of an example power supply controller (PSC) of a power supply of the welding system.

With reference to FIG. 3, there is a block diagram of an example of PSC 104. In the example of FIG. 3, PSC 104 receives from a current sense point, such as a sense point in power supply 102, an analog current i that represents a measurement of weld current I generated by the power supply. PSC 104 also receives from a sense point, such as from output terminals 130a and/or 130b of power supply 102, an analog voltage u that is a measurement of voltage V associated with current i. Voltage u represents a remote arc voltage measurement, or a remotely measured arc voltage.

PSC 104 includes a voltage pipeline 306u to sample and condition (e.g., filter) analog voltage u, to produce filtered digitized voltage values u_filt (also referred to as voltage values u_filt), which represent a measured arc voltage (i.e., measured arc voltage values). PSC also includes a current pipeline 306i to sample and condition (e.g., filter) analog current i, to produce filtered digitized current values i_filt (also referred to as current values i_filt), which represent a measured current (i.e., measured current values). PSC 104 further includes a sample processor 307 to process current and voltage values i_filt and u_filt. For example, sample processor 307 includes a voltage compensator 310 and an inductance tracker 312. In accordance with embodiments presented herein, voltage compensator 310 performs arc voltage compensation based on values for resistance and inductance R, L (of the weld circuit) provided to/received by the voltage compensator to compensate voltage values u_filt (i.e., the measured arc voltage), to produce compensated (arc) voltage values u_comp that represent accurate estimates of arc voltage $V_{ARC}$. Also in accordance with the embodiments, inductance tracker 312 tracks inductance L as it changes, and adjusts the inductance value provided to voltage compensator 310, accordingly, based in part on a (time) derivative of compensated voltage values u_comp and a second (time) derivative of current values i_filt. Voltage compensator 310 and inductance tracker 312 exchange various information with each in order to execute their respective operations, as described below.

PSC 104 also includes a local controller 313, such as a processor or microcontroller, a memory 314, and a clock generator 316 coupled with each other, and with current and voltage pipelines 306i, 306u and sample processor 307. Controller 313 provides overall control of PSC 104 and power supply 102. To this end, controller 313 generates power supply control signals or commands 318 used to control the weld current generated by power supply 102. For example, controller 313 asserts commands 318 to control a current level of the weld current, and a timing of the weld current pulses, such as their start and stop times. Controller 313 also receives compensated voltage u_comp from sample processor 307, and asserts commands 318 responsive to the compensated voltage u_comp.

Memory 314 stores non-transitory computer readable program instructions/logic instructions 315 that, when executed by controller 313, cause the controller to perform the operations described herein, e.g., operations for sample processor 307. For example, memory 314 may store program instructions that implement the arc voltage compensation and inductance tracking, and general current and voltage sample processing for a welding or cutting operation. Memory 314 also stores data used and produced by controller 313, such as values of compensated voltage u_comp, weld current levels, and so on. Clock generator 316 generates clocks 320 used to drive other components of PSC 104, such as current and voltage pipelines 306i, 306u, and sample processor 307. In embodiments, components of PSC 104 may include electronic circuitry such as, for example, programmable logic circuitry, field-programmable gate arrays (FPGA), or programmable logic arrays (PLA) to execute the computer readable program instructions, which may include microcode, firmware, and so on.

Figure 4:
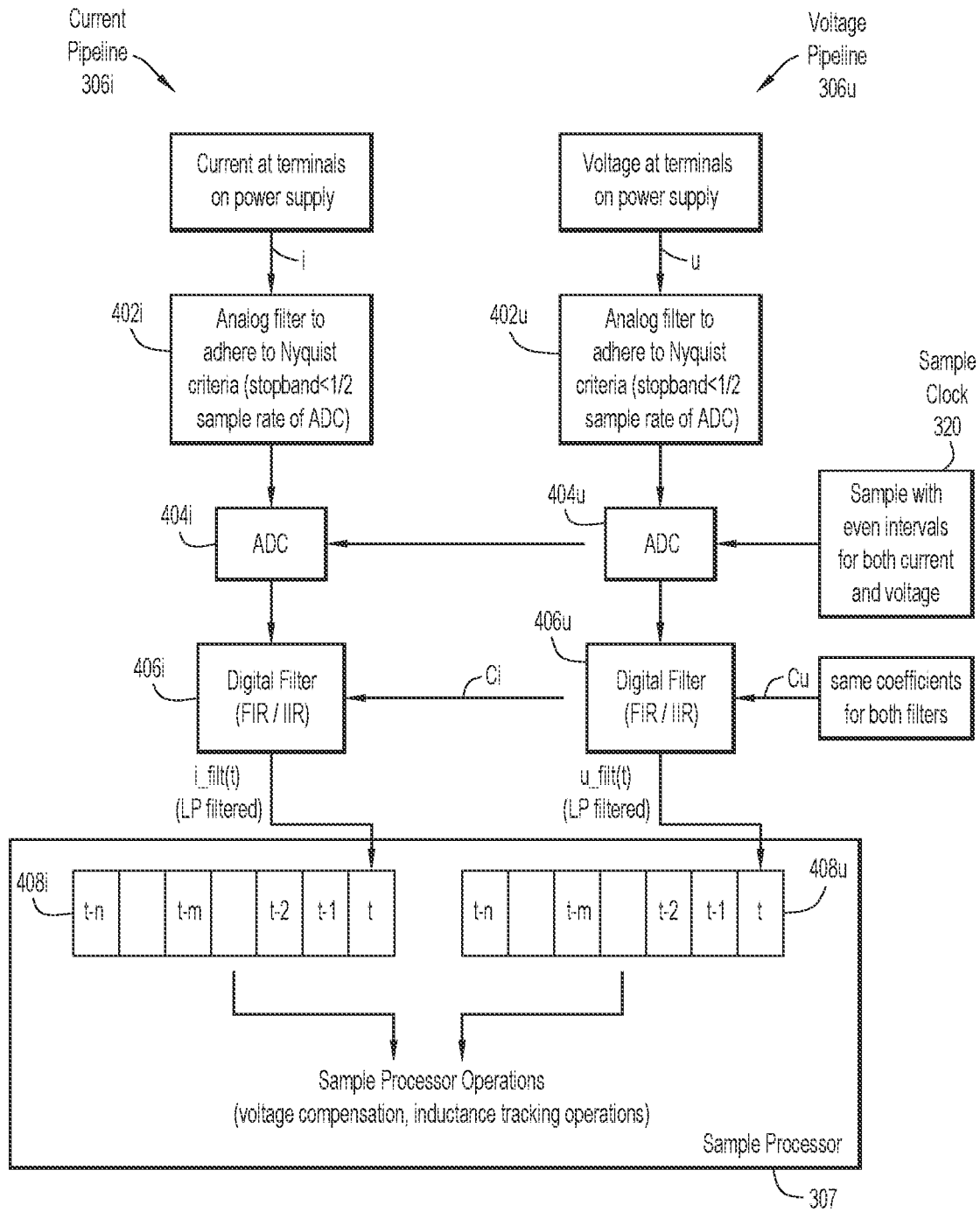
FIG. 4 is a block diagram of example current and voltage pipelines of the PSC for processing sensed/measured current and voltage in the welding system, respectively.

With reference to FIG. 4, there is a block diagram of current pipeline 306i and voltage pipeline 306u, which may operate, i.e., perform their respective operations, in parallel with each other, i.e., concurrently. Current pipeline 306i includes, in sequence, an analog anti-alias (or "aliasing") filter 402i, an analog-to-digital converter (ADC) (or "digitizer") 404i, and a digital filter 406i. Digital filter 406i feeds a memory or sample buffer 408i, which may be implemented in voltage compensator 310 of sample processor 307. Current pipeline 306i receives current i as sensed or measured at power supply 102, for example. Anti-alias filter 402i filters current i, to produce an anti-aliased current. An analog-to-digital converter (ADC) 404i performs the sampling or digitizing process. As used herein, the terms "sampling" and "digitizing" are synonymous and may be used interchangeably. ADC 404i digitizes the anti-aliased current at a sample rate (e.g., mega samples per second (Msps)) established by clocks 320, to produce a sequence of time ordered digitized current values, each associated with a corresponding sample time t. As used herein, the term "value" is synonymous, and may be used interchangeably, with the terms "sample" and "measurement."

Digital filter 406i digitally filters the digitized current values in the time domain based on filter coefficients Ci, to produce a sequence of time ordered digitized (digitally) filtered current values i_filt. The term "i_filt" may refer to multiple filtered digitized current values or a single filtered digitized current value, depending on context. In an example, digital filter 406i operates as a low pass filter. Digital filter 406i stores current values i_filt into memory buffer 408i of sample processor 307 in sample time order, e.g., with sample time increasing from left-to-right in FIG. 4. Thus, successive positions of the values in memory buffer 408i represent successive sample times (also referred to as sample time indexes) of the values. Thus, time differences between different ones of the values may be determined based on their positions. For example, traversing values in buffer 408i from right-to-left, the last sampled value has a sample time index t0, the previously sampled value has a sample time index t−1, the sample previous to that has a sample time index t−2, and so on.

Similar to current pipeline 306i, voltage pipeline 306u includes, in series, an analog anti-alias filter 402u, an ADC or ("digitizer") 404u, and a digital filter 406u. Digital filter 406u feeds a memory or sample buffer 408u, which may be implemented in voltage compensator 310 of sample processor 307. Each of components 40Xu of voltage pipeline 306u operate similarly to corresponding components 40Xi of current pipeline 306i. Voltage pipeline 306u receives analog voltage u as sensed at output terminal 130a and 130b of power supply 102, for example. Anti-alias filter 402u filters analog voltage u, to produce an anti-aliased voltage u.

ADC 404u digitizes the anti-aliased voltage at a sample rate established by clocks 320, to produce a sequence of time ordered digitized voltage values, each associated with a corresponding sample time t. In an example, ADC 404u and ADC 404i perform their respective sampling based on the same sample clock, so that the digitized voltage values and the digitized current values are produced concurrently and at the same rate. That is, for each digitized voltage value, there is a corresponding digitized current value, which is produced at the same time (i.e., concurrently) as the digitized voltage value.

Digital filter 406u digitally filters (e.g., low pass filters) the digitized voltage values in the time domain based on filter coefficients Cu, to produce a sequence of time ordered filtered digitized voltage values u_filt. The term "u_filt" may refer to multiple filtered digitized voltage values or a single filtered digitized voltage value, depending on context. Digital filter 406u stores filtered voltage values u_filt into memory buffer 408u of sample processor 307 in time order, as shown in FIG. 4. Comparing memory buffers 408u and 408i, filtered voltage values u_filt in memory buffer 408u at locations/with time indexes t−n, t−m, t−2, t−1, and t0 correspond to (i.e., were sampled concurrently with corresponding ones of) filtered current values i_filt in memory buffer 408i at locations/time indexes t−n, t−m, t−2, t−1, and t0. Current and voltage values i_filt, u_filt having the same sample time index because they result from concurrent sampling of current and voltage i, u are referred to as a pair of concurrent current and voltage values, or simply as corresponding current and voltage values.

Over time, current and voltage pipelines 306i, 306u perform their respective operations concurrently, and repeatedly and continuously update memory buffers 408i, 408u with new filtered current and voltage values i_filt, u_filt. Sample processor 307 accesses the current and voltage values i_filt, u_filt stored in memory buffers 408i, 408u to perform voltage compensation and inductance tracking based on the values, as described below.

Voltage compensator 310 will now be described in connection with FIG. 5. Then, inductance tracker 312 will be described in connection with FIGS. 6-10.

Figure 5:
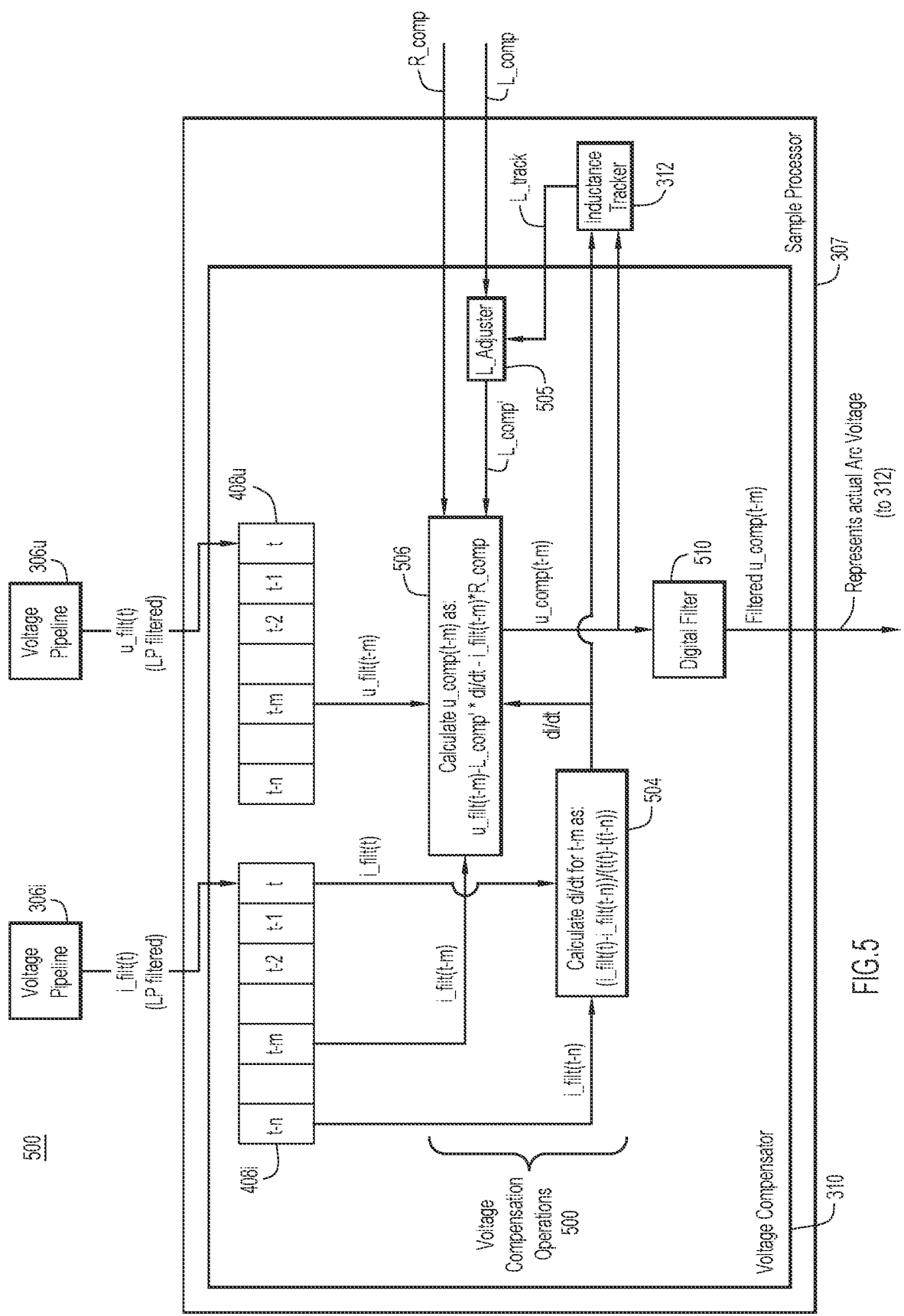
FIG. 5 shows example voltage compensation operations and inductance tracking operations performed by the PSC to compensate a measured arc voltage for inductive and resistive voltage drops in the weld circuit.

With reference to FIG. 5, there is a block diagram that shows example operations 500 performed by voltage compensator 310 to compensate the measured arc voltage (e.g., voltage values u_filt) for inductive and resistive voltage drops in the weld circuit, to produce values of compensated arc voltage u_comp as an estimate of the actual arc voltage. Voltage compensator 310 interacts with inductance tracker 312 to compute compensated arc voltage u_comp. More specifically, inductance tracker 312 tracks the inductance of the weld circuit and provides information about the tracked inductance to voltage compensator 310 to enable the voltage compensator to compute values of u_comp that accurately reflect the inductance.

At a high level, PSC 104 controls power supply 102 to generate weld current and voltage, including a series of current pulses and corresponding voltage pulses, for a weld operation. Concurrently, voltage and current pipelines 306i, 306u repeatedly sample and process the current and voltage to produce corresponding current and voltage values i_filt and u_filt as described above. Voltage compensator 310 interacts with inductance tracker 312 to compute compensated arc voltage u_comp from voltage values u_filt (e.g., the measured arc voltage), based on current values i_filt (e.g., the measured current), a resistance value R_comp that represents resistance R of the weld circuit, and an inductance value L_comp that represent inductance L of the weld circuit. Resistance value R_comp and inductance L_comp may be predetermined values, or may be calibrated values produced by a calibration process, and provided as initial inputs to voltage compensator 310, for example. Voltage compensator 310 computes a single value for compensated voltage u_comp, e.g., u_comp(t−m), corresponding to a single voltage value, e.g., u_filt(t−m), as described below.

At 504, voltage compensator 310 computes a first (time) derivative of current values i_filt (i.e., current slope di/dt) at sample time t−m as:

$$di/dt(t-m)=(i\_filt(t)-i\_filt(t-n))/(t(t)-t(t-n)).$$

Thus, operation 504 employs two time-separated current values i_filt that straddle sample time t−m to compute di/dt. That is, sample time t−m represents a sample time (e.g., a midpoint) between the sample times of the current values used to compute di/dt.

Voltage compensator 310 receives resistance value R_comp and inductance value L_comp. At 505, voltage compensator 310 receives a signal L_track (which may be referred to simply as "L_track") derived by inductance tracker 312 to represent a present change (if any) of the inductance of the weld circuit, and adjusts inductance value L_comp based on L_track, to produce an adjusted inductance value L_comp'. In an example, in which inductance tracker 312 derives L_track as an (adjustment) inductance value, operation 505 may sum L_comp with L_track to produce L_comp'. In another example in which inductance tracker 312 derivers L_track as a command to increase or decrease inductance (i.e., as an inductance adjustment command), operation 505 increases or decreases the present value of L_comp' according to the command, to produce an increased or decreased version of L_comp' for subsequent use in voltage compensation.

At 506, using the (adjusted) inductance value L_comp', voltage compensator 310 computes a value of compensated voltage u_comp(t−m) as:

$$u\_comp(t-m)=u\_filt(t-m)-L\_comp'*di/dt(t-m)-i\_filt(t-m)*R\_comp \quad \text{Eq. 1,}$$

where L_comp'*di/dt(t−m) and i(t−m)*R_comp respectively represent inductive and resistive voltage drops of the weld circuit, as computed by the voltage compensator.

Voltage compensator 310 repeats operations 504-506 for successive current, voltage, and inductance adjustment values i_filt, u_filt, and L_track (and L_comp') to produce successive values of compensated voltage u_comp. For each successive compensated value of compensated voltage u_comp, sample time index t+1 replaces sample time index t, i.e., the sample time index is incremented. In other words, voltage compensator 310 computes a compensated voltage value u_comp corresponding to each voltage value u_filt. The term "u_comp" may refer to multiple compensated voltage values or a single compensated voltage value, depending on context.

Optionally, at 510, voltage compensator 310 digitally filters compensated voltage u_comp to produce a version of compensated voltage u_comp, which may be used for other computations.

Inductance tracker 312 is now described. More specifically, challenges associated with tracking the inductance of the weld circuit, principles that form the basis upon which inductance tracker 312 operates, and detailed operations of the inductance tracker are described below in connection with FIGS. 6-10. As mentioned above, inductance (L) is the ratio of a voltage induced in a conductor to the rate of change of a current (di/dt) causing the voltage, and power supply 102 delivers welding power through the weld circuit to create an arc at workpiece 114 in arc welding. Even with the same weld cable setup, the inductive voltage di/dt*L may vary by a significant amount. Repeating the calibration procedure to track the change in the inductance is inconvenient, time consuming, and often not possible, so real-time tracking of inductance during a welding operation is desirable.

There are several problems with attempting to track the inductive voltage change di/dt*L during the welding operation. First, noise from the arc is magnitudes larger than the voltage of interest. The arc voltage can vary a large amount during short time-spans, e.g., early droplet formation is 3V/ms and even this slow event can drown out the inductive voltage of interest. Further, the arc voltage can be anywhere between a few volts and tens of volts during the weld.

Further, the change in current over time (di/dt) in the weld circuit (e.g., welding cable) depends primarily on two sources: controlled and spontaneous events. Controlled events include current changes initiated by control over the power supply, i.e., a commanded power waveform. These current changes are not problematic. However, spontaneous current changes (e.g., a droplet just released from the wire electrode) can corrupt measurements, and deliberate changes to the weld circuit, such as adding or subtracting resistance, can corrupt the measurements.

Finally, there is no "zero" level (i.e., reference value) to compare against for di/dt*L, i.e., in order to make a decision on a value of L. Using average voltage does not work, because the arc voltage changes too much.

Accordingly, inductance tracker 312 overcomes the challenges mentioned above to track inductance changes in the weld circuit that cause corresponding voltage changes during welding, without the overhead of frequently recalibrating cable compensation (e.g., values of R and L for the weld circuit). Inductance tracker 312 derives an accurate estimate of a change in inductance (i.e., tracks the inductance) of the weld circuit during a welding operation (i) over short time windows when the arc voltage is relatively stable, i.e., to minimize variations in the arc voltage, (ii) when the current is relatively stable but at a high level, and (iii) when power supply 102 generates a controlled current in the weld circuit. Under these conditions, inductance tracker computes (i) a second time derivative (referred to simply as a "second derivative") of current ($d^2i/dt^2$), (ii) a first time derivative (referred to simply as a "derivative") of compensated arc voltage u_comp (du_comp/dt) corresponding in time to the second derivative, and (iii) tracks the inductance of the weld circuit (or changes thereto) based on the relationship $du\_comp/dt=-d^2i/dt^2*L$. That is, inductance tracker 312 evaluates this relationship, and adjusts (or causes the adjustment of) an inductance value used for voltage compensation, accordingly. Generally, embodiments presented herein count/measure du_comp/dt (which may or may not be zero depending on how well the voltage compensation is performing), and use d2i/dt2 as an indicator.

When derivative du_comp/dt≠0, as it should when the inductance value used to compute compensated voltage u_comp is not equal to the (actual) inductance of the weld circuit, inductance tracker 312 concludes that the inductance value differs from the inductance and should be adjusted. Under that condition, inductance tracker 312 evaluates a relationship between the respective signs of du_comp/dt and $d^2i/dt^2$. The relationship between the signs indicates to inductance tracker 312 how the inductance value and the inductance differ, i.e., the direction in which the inductance value should be adjusted (e.g., increased or decreased) to drive the inductance value closer to (i.e., toward) the inductance. Therefore, inductance tracker 312 drives or adjusts the inductance value in that direction. Inductance tracker 312 continues to adjust the inductance value over time until du_comp/dt=0.

The relationship du_comp/dt=$-d^2i/dt^2$*L best applies when samples/values of u_comp and di/dt used to compute du_comp/dt and $d^2i/dt^2$, respectively, are taken over a short time window, using samples/values that are spaced-apart in time by only a few μs, for example. This time window needs to be sufficiently small for the arc to remain stable so as not to significantly impact du_comp/dt. Thus, by using the small time window to measure the second derivative of current $d^2i/dt^2$, the arc voltage does not vary a large amount. The small variation expected on the arc voltage is considered as uncorrelated white noise, i.e., not synchronized with values/samples of u_comp, di/dt, $d^2i/dt^2$. This means that, on average, the contribution from the arc voltage is zero, as long as a sufficient number of $d^2i/dt^2$ (and du_comp/dt) samples are taken over a period of time.

The concept may further involve identifying periods of high $d^2i/dt^2$ and sufficiently high current i and sampling the compensated voltage derivative du_comp/dt during these instances to track inductance. Also, du_comp/dt is inversely proportional to the error in the compensated inductance so a large du_comp/dt value during a small $d^2i/dt^2$ event could indicate that there is a large error in inductance.

Measuring the derivative of the voltage compensation du_comp/dt automatically creates the missing reference, i.e., the "zero" point, enabling inductance tracker 312 to directly compare and count corresponding samples of du_comp/dt and $d^2i/dt^2$. This, in turn, enables the counting or summing of many samples, not just certain events, thus cancelling the arc voltage variations. Finally, to avoid the problem of spontaneous events (e.g., droplet separation), inductance tracker 312 may filter-out spontaneous current variations, current brake events, etc., during which the current is not purposefully controlled.

Figure 6:
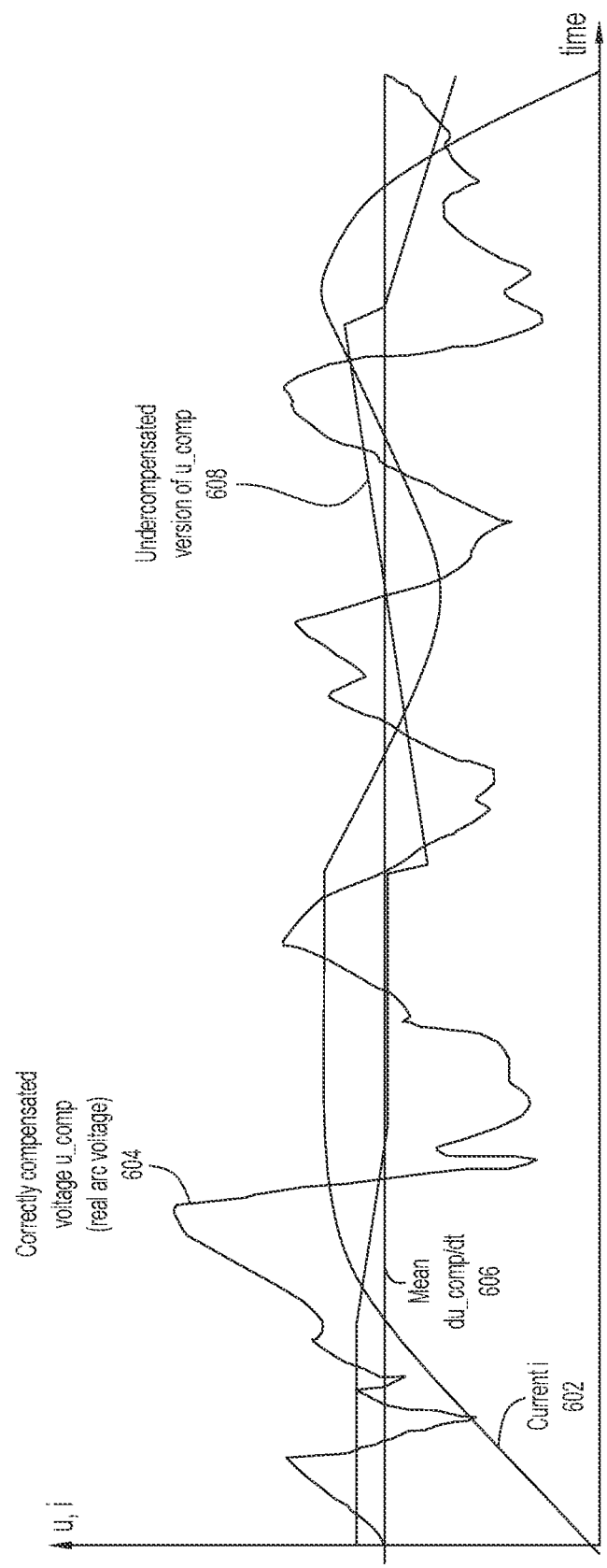
FIG. 6 shows example waveforms associated with inductance tracking.

FIG. 6 shows example waveforms for several signals/parameters described above. More specifically, FIG. 6 shows a waveform 602 for current i, a waveform 604 for correctly compensated voltage u_comp, a waveform 606 that represents a mean of du_comp/dt, and a waveform 608 that represents an under-compensated version of u_comp.

Figure 7:
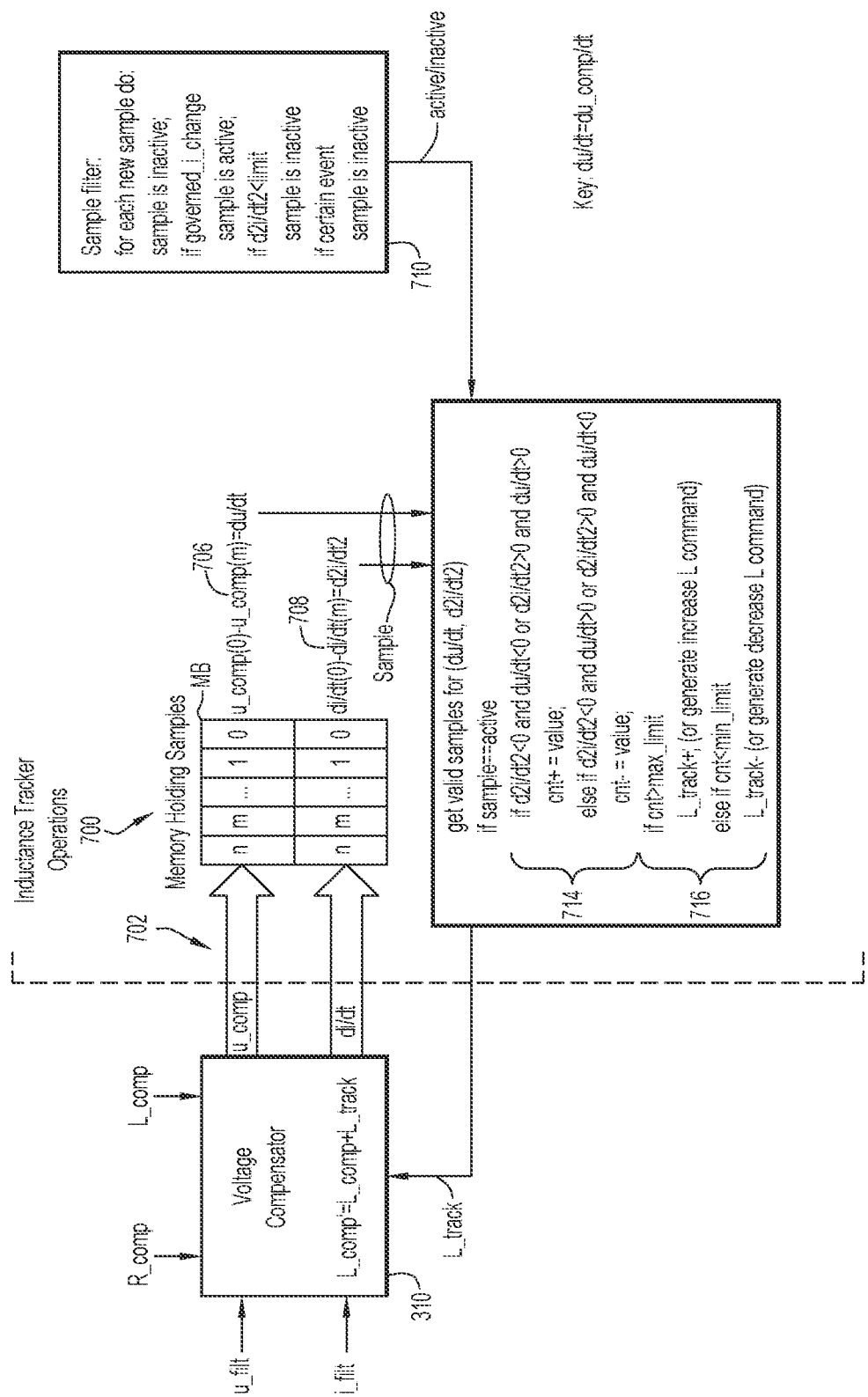
FIG. 7 shows example inductance tracking operations performed by the PSC to track the inductance of the weld circuit for use by the voltage compensation operations.

FIG. 7 shows operations 700 performed by inductance tracker 312, to produce L_track, used for voltage compensation. Operations 700 track inductance during a welding operation, i.e., while a welding operation is in process. In FIG. 7, "du/dt" is used to denote "du_comp/dt" for conciseness, and $d^2i/dt^2$ is represented as "d2i/dt2." At 702, inductance tracker 312 receives from voltage compensator 310 successive values of compensated voltage u_comp and successive values of current first derivative di/dt that correspond in time to the successive values of compensated voltage u_comp. Inductance tracker 312 stores corresponding pairs of the values of u_comp (i.e., u_comp values) and the values of di/dt (i.e., di/dt values) into corresponding pairs of positions of a memory buffer MB of inductance tracker 312. A u_comp value and a di/dt value in a corresponding pair of memory locations/positions of buffer MB coincide in time with each other.

At 706, inductance tracker 312 computes a difference between two values of u_comp that are relatively close together in time, to produce a value of the (time) derivative of u_comp (du_comp/dt). When non-zero, the value of du_comp/dt has either a negative or a positive sign. At 708, in a first arrangement, inductance tracker 312 computes a difference between two values of di/dt that coincide in time with the two values of u_comp used in 706, to produce a value of a second (time) derivative of current i ($d^2i/dt^2$) that coincides in time to/is in phase with the value of du/dt. For example, as shown in FIG. 7, inductance tracker 312 computes both the value of du_comp/dt and the in-phase value of the second derivative of current $d^2i/dt^2$ corresponding to the value of du_comp/dt using the same index m. In a second arrangement, inductance tracker computes a value of du_comp/dt from two values of u_comp and a value of $d^2i/dt^2$ from two values of di/dt chosen with respect to the two values of du/dt, such that the value of du_comp/dt and the value of $d^2i/dt^2$ are offset in time/phase offset compared to each other. That is, there is a non-zero phase shift/offset between the values of du_comp/dt and $d^2i/dt^2$. For example, inductance tracker 312 computes the value of du_comp/dt using the index m, and the phase-offset value of the second derivative of current $d^2i/dt^2$ corresponding to the value of du_comp/dt using a different index p>m or p<m. In either arrangement, when non-zero, the value of second derivative $d^2i/dt^2$ is either positive or negative. Over time, operations 702-708 produce successive corresponding pairs of values of du/dt and $d^2i/dt^2$. In the first arrangement, the values du_comp/dt and $d^2i/dt^2$ in each corresponding pair of values are in phase, while in the second arrangement, the values du_comp/dt and $d^2i/dt^2$ in each corresponding pair of values are offset in phase (or phase offset) with respect to each other. Each corresponding pair of values of du/dt and $d^2i/dt^2$ is referred to as a "sample" or a "sample pair." Next operations 710-716 operate on the successive samples (i.e., the corresponding pairs of du/dt and $d^2i/d^2t$) produced by operations 702-708, one sample at a time.

At 710, inductance tracker applies an active sample filter to each new (i.e., current/present) sample produced by operations 702-708 to identify valid samples for subsequent inductance tracking operations. The active sample filter classifies each sample as active (i.e., valid, and thus available for use in subsequent inductance tracking operations) when one or more "active" (i.e., first or "governed_i_change") conditions are present/true and when one or more "inactive" (i.e., second) conditions are not present/true. Otherwise, the active sample filter classifies each sample as inactive (i.e., invalid, and thus unavailable for use in the subsequent computations). The one or more first conditions may correspond to when PSC 104 actively (i.e., purposely) controls or governs current i during/for a welding operation based on compensated voltage u_comp, for example. On the other hand, the one or more second conditions may correspond to when (i) $d^2i/d^2t$<a predetermined threshold "limit," or (ii) the PSC does not actively (i.e., purposely) control current i during certain spontaneous/uncontrolled current events, such as when a droplet is just released from the wire electrode, for example.

When the current/present sample is classified as active (i.e., the current/present sample falls into an active window of valid samples established at 710), at 714, inductance tracker 312 determines whether inductance value L_comp' is less than the inductance of the weld circuit (i.e., is too low) or is greater than the inductance of the weld circuit (i.e., is too high) based on features of the current sample from operations 706, 708. In other words, inductance tracker 312 compares the corresponding pair of values of the derivative and the second derivative in the sample, to produce an individual result or decision that indicates whether the inductance value and the inductance differ.

More specifically, inductance tracker 312 compares the respective signs of du_comp/dt and $d^2i/dt^2$ of the current sample to each other. When the respective signs match (i.e., are the same), which indicates that inductance value L_comp' is less than the inductance of the weld circuit, inductance tracker 312 increments or increases a cumulative result represented by a counter "cnt" by an amount equal to a value, i.e., cnt+=value, where value may be an integer (e.g., +1, −2, and so on) or may have a complex dependence on (i.e., be a function of) u, i, their derivatives, and/or other parameters, for example. Alternatively, when the respective signs do not match (i.e., are different or mismatched), which indicates that inductance value L_comp' is greater than the inductance of the weld circuit, inductance tracker 312 decrements or decreases the cumulative result represented by counter cnt by an amount equal to a value, i.e., cnt−=value, where value may be an integer or have a complex dependence on u, i, their derivatives and/or other parameters.

Operation 710 may be summarized as (i) comparing the respective signs of the corresponding pair of values of du_comp/dt and $d^2i/dt^2$ in the current sample to each other to produce an individual result or decision that indicates how the inductance value and the inductance differ (i.e., whether the inductance value is less than the inductance and should be increased, or is greater than the inductance and should be decreased), and (ii) combining (e.g. summing) the individual result into the cumulative result (e.g., by incrementing or decrementing counter cnt), which provides an amplified indication of whether the inductance value is less than or greater than the inductance, and therefore should be increased or decreased.

After the increment/increase or decrement/decrease of counter cnt, at 716, inductance tracker 312 determines whether the cumulative result represented by counter cnt is greater than/exceeds a relatively high threshold max_limit. In the example in which L_track is an inductance value used to adjust L_comp, when counter cnt is greater than/exceeds max_limit, inductance tracker 312 increases or increments the value L_track (e.g., L_track=L_track+), and resets counter cnt. The cnt and L_track may be considered one and the same counter where the actual tracking value being fed back into compensation is the whole or a subset, a defined range of the counter being used to track du_comp/dt≠0. Inductance tracker 312 also determines whether the cumulative result represented by counter cnt is less than a relatively low threshold min_limit that is below the relatively high threshold. When counter cnt is less than min_limit, inductance tracker 312 decreases or decrements the value L_track (e.g., L_track=L_track−), and resets counter cnt.

In the alternative example in which L_track represents an inductance adjustment command, when counter cnt exceeds max_limit, inductance tracker 312 generates L_track as a command to increase L_comp'. Conversely, when counter cnt falls below min_limit, inductance tracker 312 generates L_track as a command to decrease L_comp'.

In either case, inductance tracker 312 provides the value L_track to operation 505 of voltage compensator 310, which adjusts value L_comp based on L_track, to produce the value L_comp' used to compute u_comp.

The effect of repeating operations 710-716 is to gather enough samples that point in the same direction (indicating to increase or decrease the inductance value) to ultimately cause the inductance tracking to increment or decrement L_track.

Similar to voltage compensator 310, inductance tracker 312 may operate on values of i_filt, u_filt, u_comp, du_comp/dt, di/dt, and $d^2i/dt^2$ that coincide in time with any portions of the current waveform, including before, during, and after current pulses of the weld current and corresponding voltage pulses of the weld voltage, and during rising and falling ramps of the current pulses (and voltage pulses). Active sample filter 710 produces valid sample pairs for du_comp/dt, $d^2i/dt^2$ that coincide in time with time segments just before, during, and just after rising/falling ramps of a given current pulse due to the test condition ($d^2i/dt^2$<limit) imposed by the active sample filter. An example of this can be seen in FIG. 10, discussed below.

Figure 8:
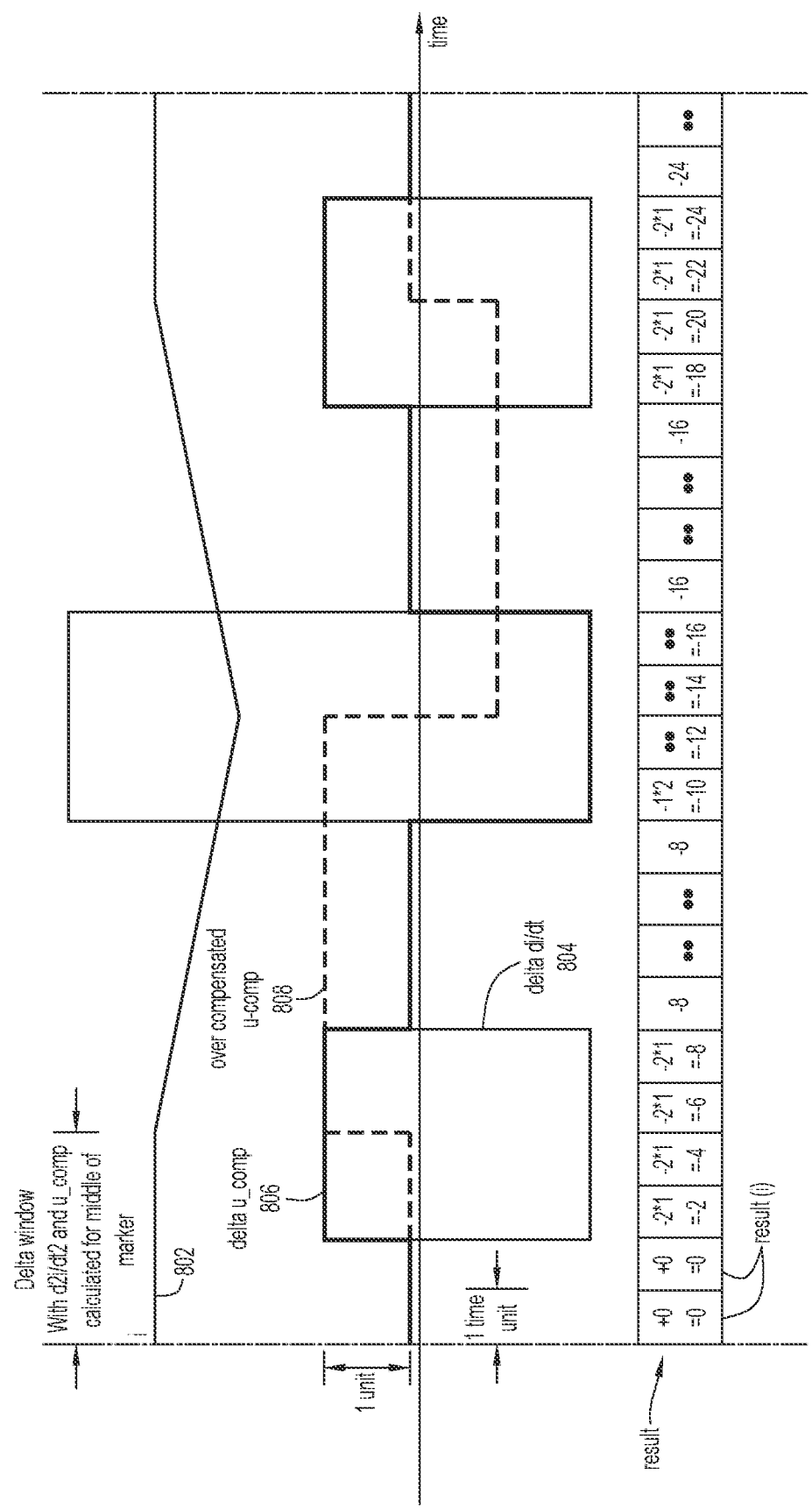
FIG. 8 shows example waveforms relating to the inductance tracking operations of FIG. 7.

FIG. 8 shows example waveforms relating to the operation of inductance tracker 312 as described in connection with FIG. 7. The waveforms include waveform 802 for current i, waveform 804 for delta di/dt ($d^2i/dt^2$), waveform 806 for delta u_comp (du_comp/dt), and waveform 808 that represents an overcompensated version of compensated voltage u_comp. Delta di/dt and delta u_comp are respective sample differences that represent digital derivatives for du_comp/dt and $d^2i/dt^2$ for the sampled operation. As shown in FIG. 8, inflection points of current i corresponding produce maximum magnitudes of ($d^2i/dt^2$).

FIG. 8 also shows a "result" sequence. For the result sequence, result(i)=delta di/dt*delta du_comp/dt, and result=sum(result(i)), where i depicts all samples summed over a given short time window.

Figure 9:
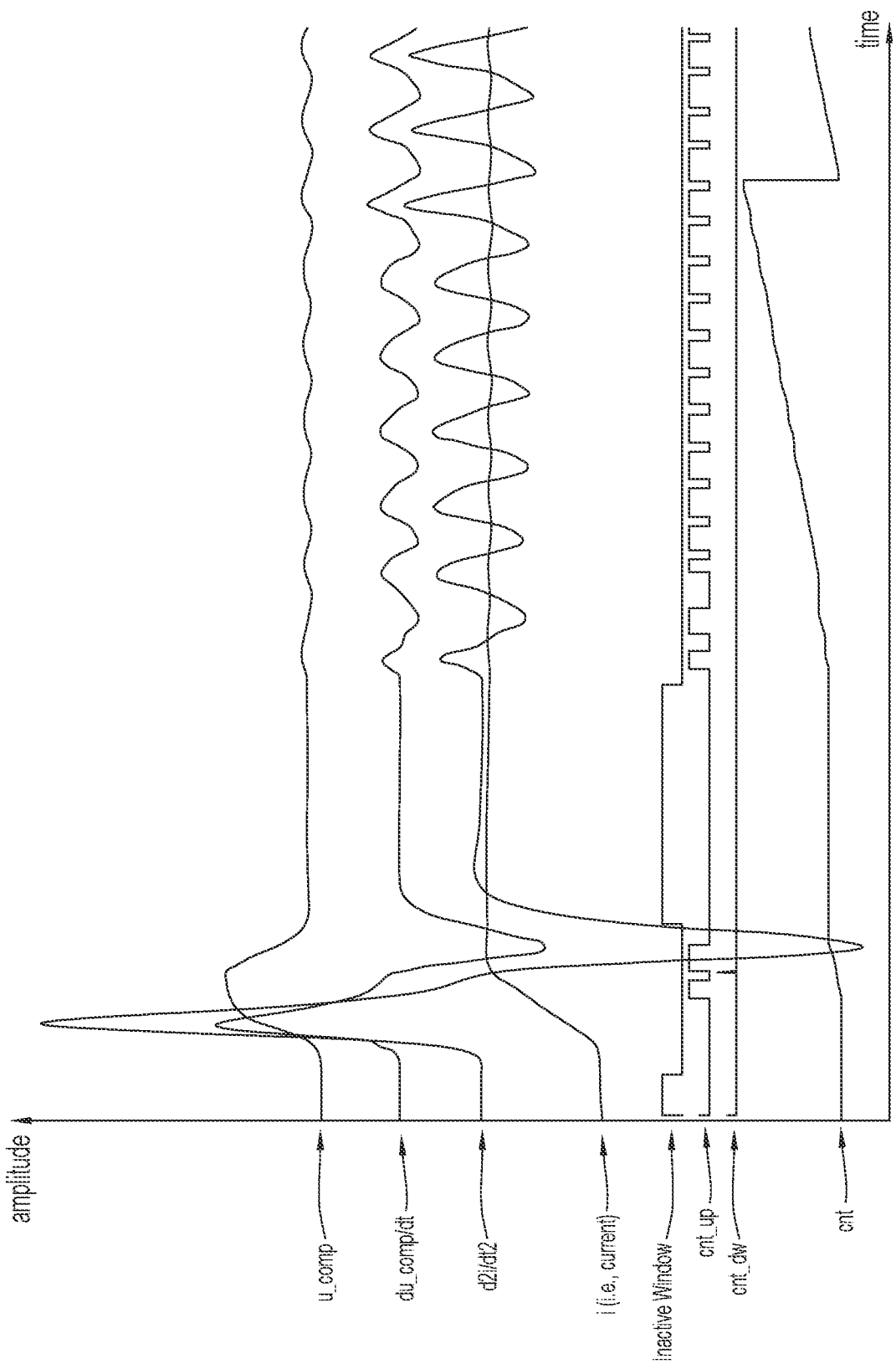
FIG. 9 shows further example waveforms relating to the inductance tracking operations of FIG. 7.

FIG. 9 shows further example waveforms relating to the operation of inductance tracker 312 as described in connection with FIG. 7. Moving top-to-bottom, FIG. 9 shows waveforms for u_comp, du_comp/dt, $d^2i/dt^2$, i, an active window determined by the active sample filter and that indicates windows of active/valid samples (logic low) and invalid samples (logic high), cnt_up (individual increment/increase events, i.e., results, for cnt), cnt_dw (individual decrement/decrease events, i.e., results, for cnt), and the cumulative result representing counter cnt.

Figure 10:
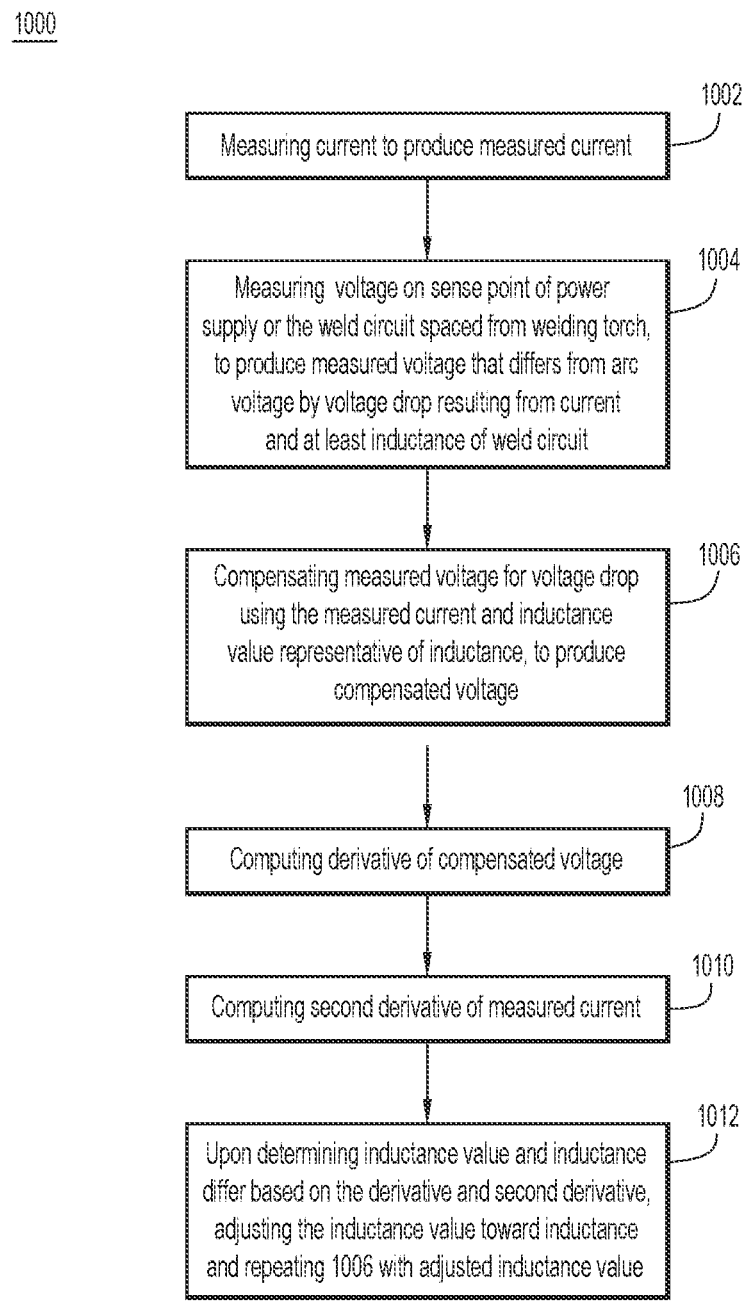
FIG. 10 is a flowchart of an example method of tracking inductance in the weld circuit and using the tracked inductance to perform compensation of the arc voltage.

With reference to FIG. 10, there is a flowchart of an example method 1000 of tracking inductance of a weld circuit of a welding or cutting system (e.g., 100) and compensating a measured voltage (representative of an arc voltage measured remotely) based on the tracked inductance. The welding or cutting system includes a power supply (e.g., 102) to deliver a current through a weld circuit to a welding torch (e.g., 110) to create an arc on a workpiece (e.g., 114).

At 1002, the system measures the current to produce a measured current (e.g., i, i_filt). The measured current may include a sequence of (measured) current values (i.e., samples).

At 1004, the system measures a voltage on/at a sense point of the power supply or the weld circuit that is spaced-apart or remote from the welding torch, to produce a measured voltage (e.g., u, u_filt) that differs from the arc voltage by a voltage drop resulting from the current and at least an inductance L of the weld circuit, e.g., the inductance L and a resistance R. The measured voltage may include a sequence of (measured) voltage values.

At 1006, the system compensates the measured voltage (u, u_filt) for the voltage drop using the measured current and at least an inductance value (e.g., L_comp'=L_comp+L_track) that is representative of the inductance, to produce a compensated voltage (e.g., u_comp). For example, the system compensates the voltage values using the current values and the inductance value to produce a sequence of the compensated voltage values (e.g., u_comp). The compensating may include computing at least an inductive voltage drop that contributes to the voltage drop based on the inductance value and a first time derivative of the measured current (e.g., di/dt), and subtracting the inductive voltage drop from the measured voltage. For further accuracy, the compensating further includes computing a resistive voltage drop that contributes to the voltage drop based on a resistance value and the measured current, and subtracting the resistive voltage drop from the measured voltage; however, it is understood that compensating for the resistive voltage drop is optional and may be omitted in some embodiments.

At 1008, the system computes a first time derivative (referred to simply as the "derivative") of the compensated voltage (e.g., du_comp/dt). For example, the system computes a sequence of digital derivative values (du_comp/dt), each derived from a corresponding pair of time-separate voltage values (u_comp).

At 1010, the system computes a second time derivative (referred to simply as "second derivative") of the measured current (e.g., $d^2i/dt^2$). For example, the system computes a sequence of digital second derivative values (e.g., $d^2i/dt^2$), each from a corresponding pair of time-separated values of the first derivative of the current (di/dt) that are time-separated. The two sequences of derivative values and second derivative values together form a sequence of time-corresponding pairs of the first derivative values and the derivative values.

At 1012, upon determining that the inductance value used to compute the compensated voltage and the (actual) inductance of the weld circuit differ based on the derivative and the second derivative, the system adjusts the inductance value toward the inductance to produce an adjusted inductance value, i.e., closes the difference between the two. That is, the outcome of the determining triggers the adjustment of the inductance value. The adjusted inductance value is fed-back to compensating operation 1006 for a next iteration of the process. The determining may include the following operations:

a. Comparing corresponding pairs of values of the derivative and the second derivative to each other to produce individual results or decisions that indicate whether and how the inductance value and the inductance differ. For example, comparing may include determining whether respective signs of the corresponding pairs of values match or mismatch each other, to produce the individual results to indicate whether the inductance value is less than or greater than the inductance, respectively.
  b. Combining (e.g., summing) the individual results into a cumulative result (e.g., cnt). For example, summing may be implemented by (i) incrementing/increasing the cumulative result (e.g., cnt=cnt+) each time an individual result indicates the inductance value is less than the inductance (e.g., when the respective signs match each other, i.e., are matched), (ii) and decrementing/decreasing the cumulative result (e.g., cnt=cnt−) each time an individual result indicates the inductance is greater that the inductance (e.g., when the respective signs do not match each other, i.e., are mismatched).
  c. Comparing the cumulative result to at least one threshold (e.g., max_limit and min_limit).
  d. When the cumulative result crosses the at least one threshold, triggering adjusting the inductance value. For example, when the cumulative result is greater than a high threshold (e.g., cnt>max_limit), adjusting includes increasing the inductance value (e.g., L_track=L_track+, or sending an inductance increase command, either of which increases L_comp'). When the cumulative result is less than a low threshold (e.g., min_limit) that is below the high threshold, adjusting includes decreasing the inductance value (e.g., L_track=L_track−, or sending an inductance decrease command, either which decreases L_comp').

In an embodiment, operation 1012 may be qualified. That is, the system may determine an active window during which corresponding values of the derivative of the compensated voltage and the second derivative of the measured current are valid (as described above in connection with FIG. 7), and perform operation 1012 only during the active window.

The system repeats operations 1002-1012 over time using the adjusted inductance value (i.e., the inductance value as adjusted at 1012), which implements a feedback loop between operation 1006, which computes the compensated voltage based on the inductance value, and operations 1008-1012, which adjust the inductance value based on the compensated voltage and feeds the adjusted inductance value back to operation 1006. In the embodiments presented herein, operation of inductance tracker 312 to derive L_track forms an i-regulator for the compensated inductance via the u_comp values being computed.

By way of example, the embodiments presented herein have been described in the context of processing (e.g., sampling, filtering, and so on) current pulses and corresponding voltage pulses produced by a power supply for welding or cutting, to compensate voltage and track inductance. In other embodiments, such processing may also be performed on current and voltage that is not necessarily pulsed, i.e., non-pulsed or steady state (e.g., DC) current and voltage. Moreover, the embodiments may be practiced in the absence of ADCs, and thus applied to processing of analog current and analog voltage waveforms and analog measurements thereof. For example, voltage compensation and inductance tracking operations may be performed directly on analog measured current i and voltage u.

In summary, in some aspects, the techniques described herein relate to a method performed in a welding or cutting system, including a power supply to deliver a current through a weld circuit to a welding torch to create an arc on a workpiece, including: measuring the current to produce a measured current; measuring a voltage on a sense point of the power supply or the weld circuit that is spaced-apart from the welding torch, to produce a measured voltage that differs from an arc voltage by a voltage drop caused by the current and at least inductance of the weld circuit; compensating the measured voltage for the voltage drop using the measured current and an inductance value that represents the inductance, to produce a compensated voltage; computing a derivative of the compensated voltage; computing a second derivative of the measured current; and upon determining that the inductance value and the inductance differ based on the derivative and the second derivative, adjusting the inductance value toward the inductance and repeating compensating with the inductance value as adjusted.

In some aspects, the techniques described herein relate to a method, wherein determining includes: comparing corresponding pairs of values of the derivative and the second derivative to produce individual results that indicate whether the inductance value and the inductance differ; summing the individual results into a cumulative result; comparing the cumulative result to at least one threshold; and when the cumulative result crosses the at least one threshold, triggering adjusting.

In some aspects, the techniques described herein relate to a method, wherein: summing includes incrementing and decrementing the cumulative result when the individual results indicate the inductance value is less than or greater than the inductance.

In some aspects, the techniques described herein relate to a method, wherein: comparing includes determining whether respective signs of the corresponding pairs of values match or mismatch each other, to produce the individual results to indicate whether the inductance value is less than or greater than the inductance, respectively.

In some aspects, the techniques described herein relate to a method, wherein a relationship between respective signs of corresponding values of the derivative and the second derivative indicate whether the inductance value is less than or greater than the inductance.

In some aspects, the techniques described herein relate to a method, wherein when the respective signs of the corresponding values of the derivative and the second derivative are matched or mismatched, the inductance value is less than or greater than the inductance, respectively.

In some aspects, the techniques described herein relate to a method, wherein the corresponding values of the derivative and the second derivative are in phase with each other.

In some aspects, the techniques described herein relate to a method, wherein the corresponding values of the derivative and the second derivative are phase offset with respect to each other.

In some aspects, the techniques described herein relate to a method, wherein compensating includes: computing an inductive voltage drop that contributes to the voltage drop based on the inductance value and a first derivative of the measured current; and subtracting the inductive voltage drop from the measured voltage.

In some aspects, the techniques described herein relate to a method, wherein compensating further includes: computing a resistive voltage drop that contributes to the voltage drop based on a resistance value and the measured current; and subtracting the resistive voltage drop from the measured voltage.

In some aspects, the techniques described herein relate to a method, further including: determining an active window during which corresponding values of the derivative of the compensated voltage and the second derivative of the measured current are valid; and determining that the inductance value and the inductance differ and adjusting only during the active window.

In some aspects, the techniques described herein relate to a method, wherein: the measured current includes current values and the measured voltage includes voltage values; compensating includes compensating the voltage values for the voltage drop using the current values and the inductance value, to produce compensated voltage values of the compensated voltage; computing the derivative includes computing first values of the derivative; computing the second derivative includes computing second values of the second derivative; and determining includes determining that the inductance value and the inductance differ based on the first values and the second values.

In some aspects, the techniques described herein relate to an apparatus for welding or cutting including: a power supply to deliver a current through a weld circuit to a welding torch; and a controller coupled to the power supply and configured to perform: receiving a measured current that is representative of the current; receiving, from a sense point of the power supply or the weld circuit that is spaced from the welding torch, a measured voltage that differs from an arc voltage by a voltage drop resulting from the current and at least inductance of the weld circuit; compensating the measured voltage for the voltage drop using the measured current and an inductance value that represents the inductance, to produce a compensated voltage; computing a derivative of the compensated voltage; computing a second derivative of the measured current; and upon determining that the inductance value and the inductance differ based on the derivative and the second derivative, adjusting the inductance value toward the inductance and repeating compensating with the inductance value as adjusted.

In some aspects, the techniques described herein relate to an apparatus, wherein the controller is configured to perform determining by: comparing corresponding pairs of values of the derivative and the second derivative to produce individual results that indicate whether the inductance value and the inductance differ; summing the individual results into a cumulative result; comparing the cumulative result to at least one threshold; and when the cumulative result crosses the at least one threshold, triggering adjusting.

In some aspects, the techniques described herein relate to an apparatus, wherein the controller is configured to perform summing by incrementing and decrementing the cumulative result when the individual results indicate the inductance value is less than or greater than the inductance.

In some aspects, the techniques described herein relate to an apparatus, wherein the controller is configured to perform comparing by determining whether respective signs of the corresponding pairs of values match or mismatch each other, to produce the individual results to indicate whether the inductance value is less than or greater than the inductance, respectively.

In some aspects, the techniques described herein relate to an apparatus, wherein a relationship between respective signs of corresponding values of the derivative and the second derivative indicate whether the inductance value is less than or greater than the inductance.

In some aspects, the techniques described herein relate to an apparatus, wherein when the respective signs of the corresponding values of the derivative and the second derivative are matched or mismatched, the inductance value is less than or greater than the inductance, respectively.

In some aspects, the techniques described herein relate to an apparatus, wherein the controller is configured to perform compensating by: computing an inductive voltage drop that contributes to the voltage drop based on the inductance value and a first derivative of the measured current; and subtracting the inductive voltage drop from the measured voltage.

In some aspects, the techniques described herein relate to an apparatus, wherein the controller is further configured to perform compensating by: computing a resistive voltage drop that contributes to the voltage drop based on a resistance value and the measured current; and subtracting the resistive voltage drop from the measured voltage.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed in a welding or cutting system, including a power supply to supply an output voltage to, and deliver a current associated with the output voltage through, a weld circuit to a welding torch to create an arc on a workpiece, comprising:
  measuring the current on a current sense point of the power supply or the weld circuit to produce a measured current;
  measuring a voltage on a voltage sense point of the power supply or the weld circuit that is spaced-apart from the welding torch, to produce a measured voltage that differs from an arc voltage at the arc by a voltage drop caused by the current and an inductance of the weld circuit;
  compensating the measured voltage for the voltage drop using the measured current and an inductance value that is an estimate of the inductance, to produce a compensated voltage;
  computing a derivative of the compensated voltage;
  computing a second derivative of the measured current; and
  upon determining that the inductance value and the inductance differ based on the derivative and the second derivative, adjusting the inductance value toward the inductance and repeating compensating with the inductance value as adjusted.

2. The method of claim 1, wherein determining includes:
  comparing corresponding pairs of values of the derivative and the second derivative to produce individual results that indicate whether the inductance value and the inductance differ;
  summing the individual results into a cumulative result;
  comparing the cumulative result to a threshold for the cumulative result; and
  when the cumulative result crosses the threshold, triggering, and adjusting.

3. The method of claim 2, wherein:
  summing includes incrementing and decrementing the cumulative result when the individual results indicate the inductance value is less than or greater than the inductance.

4. The method of claim 2, wherein:
  comparing includes determining whether respective signs of the corresponding pairs of the values match or mismatch each other, to produce the individual results to indicate whether the inductance value is less than or greater than the inductance, respectively.

5. The method of claim 1, wherein a relationship between respective signs of corresponding values of the derivative and the second derivative indicate whether the inductance value is less than or greater than the inductance.

6. The method of claim 5, wherein when the respective signs of the corresponding values of the derivative and the second derivative are matched or mismatched, the inductance value is less than or greater than the inductance, respectively.

7. The method of claim 5, wherein the corresponding values of the derivative and the second derivative are in phase with each other.

8. The method of claim 5, wherein the corresponding values of the derivative and the second derivative are phase offset with respect to each other.

9. The method of claim 1, wherein compensating includes:
  computing an inductive voltage drop that contributes to the voltage drop based on the inductance value and a first derivative of the measured current; and
  subtracting the inductive voltage drop from the measured voltage.

10. The method of claim 9, wherein compensating further includes:
  computing a resistive voltage drop that contributes to the voltage drop based on a resistance value and the measured current; and
  subtracting the resistive voltage drop from the measured voltage.

11. The method of claim 1, wherein:
  determining includes determining whether respective signs of the derivative and the second derivative are matched or mismatched; and
  adjusting includes, when the respective signs are matched or mismatched, respectively increasing or decreasing the inductance value.

12. The method of claim 1, wherein:
  the measured current includes current values and the measured voltage includes voltage values;
  compensating includes compensating the voltage values for the voltage drop using the current values and the inductance value, to produce compensated voltage values of the compensated voltage;
  computing the derivative includes computing first values of the derivative;
  computing the second derivative includes computing second values of the second derivative; and
  determining includes determining that the inductance value and the inductance differ based on the first values and the second values.

13. An apparatus for welding or cutting comprising:
  a power supply to supply an output voltage to, and deliver a current associated with the output voltage through, a weld circuit to a welding torch to produce an arc; and
  a controller coupled to the power supply and configured to perform:
    receiving a measured current from a current sense point of the power supply or the weld circuit and that is representative of the current;
    receiving, from a voltage sense point of the power supply or the weld circuit that is spaced-apart from the welding torch, a measured voltage that differs from an arc voltage at the arc by a voltage drop resulting from the current and an inductance of the weld circuit;
    compensating the measured voltage for the voltage drop using the measured current and an inductance value that is an estimate of the inductance, to produce a compensated voltage;
    computing a derivative of the compensated voltage;
    computing a second derivative of the measured current; and
    upon determining that the inductance value and the inductance differ based on the derivative and the second derivative, adjusting the inductance value toward the inductance and repeating compensating with the inductance value as adjusted.

14. The apparatus of claim 13, wherein the controller is configured to perform determining by:
  comparing corresponding pairs of values of the derivative and the second derivative to produce individual results that indicate whether the inductance value and the inductance differ;
  summing the individual results into a cumulative result;
  comparing the cumulative result to a threshold for the cumulative result; and
  when the cumulative result crosses the threshold, triggering, and adjusting.

15. The apparatus of claim 14, wherein the controller is configured to perform summing by incrementing and decrementing the cumulative result when the individual results indicate the inductance value is less than or greater than the inductance.

16. The apparatus of claim 14, wherein the controller is configured to perform comparing by determining whether respective signs of the corresponding pairs of the values match or mismatch each other, to produce the individual results to indicate whether the inductance value is less than or greater than the inductance, respectively.

17. The apparatus of claim 13, wherein a relationship between respective signs of corresponding values of the derivative and the second derivative indicate whether the inductance value is less than or greater than the inductance.

18. The apparatus of claim 17, wherein when the respective signs of the corresponding values of the derivative and the second derivative are matched or mismatched, the inductance value is less than or greater than the inductance, respectively.

19. The apparatus of claim 13, wherein the controller is configured to perform compensating by:
 computing an inductive voltage drop that contributes to the voltage drop based on the inductance value and a first derivative of the measured current; and
 subtracting the inductive voltage drop from the measured voltage.

20. The apparatus of claim 19, wherein the controller is further configured to perform compensating by:
 computing a resistive voltage drop that contributes to the voltage drop based on a resistance value and the measured current; and
 subtracting the resistive voltage drop from the measured voltage.

\* \* \* \* \*